United States Patent [19]

Clerc

[11] 4,214,358
[45] Jul. 29, 1980

[54] METHOD OF ASSEMBLY OF TWO METALLIC PARTS

[75] Inventor: Adrien Clerc, Sassenage, France

[73] Assignee: Commissariat a l'Energie Atomique, France

[21] Appl. No.: 888,914

[22] Filed: Mar. 22, 1978

[30] Foreign Application Priority Data

Mar. 25, 1977 [FR] France ............................ 77 09046

[51] Int. Cl.$^2$ ...................... B21D 39/00; B23P 11/00
[52] U.S. Cl. ...................................... 29/520; 285/382; 403/282
[58] Field of Search ................. 29/520, 432; 403/274, 403/280, 282, 284; 285/382

[56] References Cited

U.S. PATENT DOCUMENTS

| | | | |
|---|---|---|---|
| 625,491 | 5/1899 | Converse | 29/520 UX |
| 1,092,464 | 4/1914 | Watson et al. | 285/382 X |
| 1,919,552 | 7/1933 | Hasselquist | 29/520 X |
| 1,946,064 | 2/1934 | Creveling | 285/382 X |
| 2,144,117 | 1/1939 | Miller | 285/382 X |

FOREIGN PATENT DOCUMENTS

270375  8/1913  Fed. Rep. of Germany ............. 29/520
596136 12/1947  United Kingdom ..................... 285/382

*Primary Examiner*—Charlie T. Moon
*Attorney, Agent, or Firm*—Thomas J. Greer, Jr.

[57] ABSTRACT

A first part formed of hard metal to be joined to a second part of soft or malleable metal has an end portion of reduced diameter which is machined in the junction zone between the normal portion and the end portion of the first part in such a manner that the junction profile is a surface of revolution about the axis of the assembly and forms a groove. The junction surface is defined by a first portion of conical surface having a vertex directed towards the first part and by a second portion of conical surface directed towards the first part, the junction between the two portions of conical surface being formed by a beaded edge. The two parts are placed in a press in order to insert the edge of the second part into the groove of the second part.

3 Claims, 2 Drawing Figures

METHOD OF ASSEMBLY OF TWO METALLIC PARTS

This invention relates to a method of forming a connection between two metallic parts and more specifically between a metallic part formed of hard metal and a metallic part formed of soft or malleable metal. For example, the first part can be formed of ordinary or stainless steel and the second part can be formed of aluminum or of an aluminum alloy.

These two parts can have any desired shape but, in a preferred mode of execution, said two parts have a tubular shape, at least in their zones of junction.

The present invention is more particularly concerned with the case in which the two metallic parts to be joined together constitute after assembly a duct which must be helium-tight and must afford resistance to high pressures.

A number of methods for forming a leak-tight connection between two metallic parts are already known. Among these methods can be mentioned the following:

frictional assembly of parts obtained by the combined action of rubbing friction and application of pressure: this process consists of solid-phase welding since the joint formed is the result of a forging operation. This type of connection has good mechanical properties and electrical conductivity (case of the aluminum-copper connection). The dimensional possibilites of the connection may be limited by the power of the special machines which have to be provided in order to carry out an assembly of this type. Moreover, it is necessary to perform a large number of preliminary tests in order to determine the welding parameters corresponding to each dimension of parts to be assembled or to each type of material;

the inserts which are formed by causing a part having a predetermined profile to penetrate under pressure at room temperature into a part of soft metal which has been brought to a relatively high temperature (to 500° C. in the case of the aluminum alloy A5 which corresponds to 99.5% aluminum). At the moment of cooling, the soft metal powerfully grips the part of hard metal. Although the assemblies obtained are helium-tight, they have highly variable pressure resistance which is good in the case of the aluminum alloy A5 but becomes moderate in the case of the aluminum alloys AG3 and AG5 which contain respectively 3 and 5% magnesium. Furthermore, the quality of the assembly (namely the mechanical strength and geometry) is in fact dependent on the deformation which the hard metal part may undergo. This uncertain degree of deformation is in turn dependent on the one hand on the magnitude of penetration forces and on the other hand on the accuracy with which the two parts are brought into contact with each other;

the magnetic forming process, in which a hard metal is overlaid with a soft metal planting by employing intense electromagnetic fields produced by means of coils into which is discharged the energy stored in a capacitor;

the swaging process, which can be performed either in the hot state or in the cold state by means of special machines for rotational hammering of parts and resultant reduction in diameter. The assemblies thus formed offer excellent mechanical strength. However, very special equipment is required in order to carry out this process.

The present invention relates to a method of assembly of two metallic parts, one part being formed of a hard metal and the other part being formed of a soft or malleable metal. The method makes it possible to obtain a helium-tight connection which is capable of withstanding high pressure while dispensing with the need for any special equipment in order to achieve this result. Thus the equipment usually formed in a mechanical workshop is sufficient for this purpose. In more exact terms, said method comprises a first step in which the hard metal part is machined at the end to be joined and a second step of assembly proper in which the two parts are joined together by forging.

The method in accordance with the invention essentially consists of a first step in which the end portion of said first part is machined in the following manner: the external diameter of the end portion of said first part is reduced over a given length designated as the assembly length, said end portion is machined in the zone of connection between the normal portion of the first part and the assembly length in such a manner that the connection profile is a surface of revolution about said axis of assembly and forms a groove, said surface being defined by a first portion of conical surface having a vertex directed towards said first part and an angle equal to $\alpha$ at the vertex, a second portion of conical surface having a vertex directed towards the first part and an angle equal to $\beta$ at the vertex, the two portions of conical surface being joined together by means of a beaded edge and the two parts are subjected to the action of a press in order to obtain penetration of the edge of the second part into said groove formed in said first part.

Preferably, the angle $\alpha$ is greater than the angle $\beta$.

In order to improve the assembly over the assembly length of said first part, provision is made for at least one annular groove.

In the event that the relatively ductile material constituting the second part cannot be forged at room temperature, it is necessary to provide a heating step prior to the forging step. The two parts are then heated to a temperature such that the second part attains its forging temperature.

The invention is also concerned with the assembly of two parts by die-stamping, the part of hard material being provided over the assembly length with the external machined portions defined in the foregoing.

A more complete understanding of the invention will in any case be obtained from the following description of one mode of application of the invention which is given by way of example and not in any limiting sense, reference being made to the accompanying drawings, wherein.

As explained earlier, the method in fact consists of two separate and successive steps:on the one hand, the machining (essentially by turning on a lathe) of one end portion of the hard metal part and, on the other hand, the assembly operation proper by pressing and heating if necessary.

Figure 1:
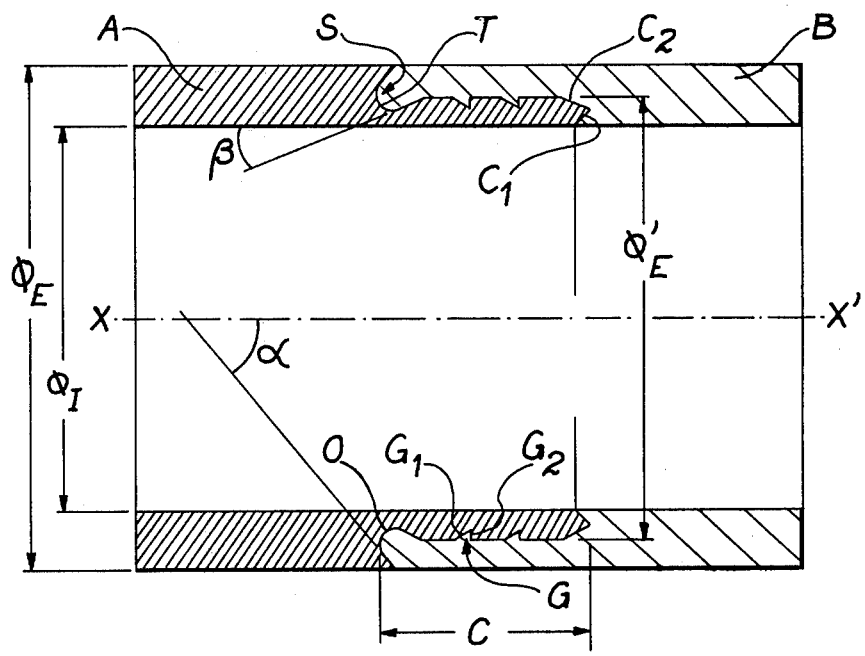
FIG. 1 is a vertical sectional view of two tubes in which machined portions are formed in the first step of the method according to the present invention.

Referring now to FIG. 1, the preliminary machining operations will first be described. In this figure, the two parts have been shown in the assembled position in accordance with the method contemplated by the invention. In this particular case, consideration is given to a first tube A formed of a hard metal and to a second tube B formed of a malleable metal.

In accordance with this method, the hard metal tube A is subjected to the machining operation solely on the end portion to be joined. The part A has an internal diameter $\phi_i$ and an external diameter $\phi_e$. It is the external diameter $\phi_e$ which is machined over the entire length of the junction end portion designated by the reference C. It can be stated in a general manner that the part A is machined along the junction end portion C in order to give said part an external diameter $\phi_e'$ which is smaller than the normal external diameter $\phi_e$ of the remainder of the part A. This zone of external diameter $\phi_e'$ is joined to the normal portion of the part A of external diameter $\phi_e$ by means of a junction surface designated by the general reference S.

The junction surface S is defined by two reversed portions of cone having an axis X—X' which coincides with the axis of the assembly, these portions of cone being joined to each other tangentially by means of a portion of concave toric surface. In the portion of external diameter $\phi_e$ of the part A, there is formed a conical recess having an angle $\alpha$ at the vertex. In the portion of smaller external diameter $\phi_e'$ of the part A, there is formed a conical portion of surface having an angle $\beta$ at the vertex.

The two portions of conical surface mentioned above are joined to each other at corresponding ends thereof, by means of a toric surface T or curved beaded edge having an axis X—X' joined tangentially to the two conical surfaces having angles $\alpha$ and $\beta$ respectively at the vertex. One of the two portions open to the original external surface, of diameter $\phi_e$ of the first tubular member A, while the other opens to the portion of reduced diameter $\phi_e'$.

It can thus be stated that the junction surface S between the portion of external diameter $\phi_e$ of the part A and the assembly length C of said part forms a groove designated by the reference O. Preferably, the angle $\alpha$ at the vertex is greater than the angle $\beta$ at the vertex. The free edge of the assembly portion C of the part A is limited by a first conical surface $C_1$ and by a second full conical surface $C_2$. The normal portion of the assembly length C of the part A is provided with grooves of revolution about the axis X—X' such as the groove G. These grooves are preferably defined by two reversed conical surfaces designated respectively by the references $G_1$ and $G_2$. One of these two surfaces, namely the surface $G_2$ is substantially perpendicular to the axis X—X'. In other words, the angle at the vertex of this conical surface is very close to 90°. Surface $G_1$ is seen to be of a slant, relative to axis X—X', opposite in direction to the slant of the conical surfaces which are in groove O.

It will be noted hereinafter that, as a result of heating and pressing operations, the junction end portion of the second malleable part B is intended to completely fill the space removed from the part A in the junction zone C.

The particular advantage of the mode of assembly which has been described in the foregoing and is in any case very straightforward can be explained as follows. When the assembly is put under internal pressure or in other words when pressure is developed within the tubes constituting the parts A and B to be assembled, this gives rise to longitudinal and tangential radial stresses. The radial stresses are distributed on the one hand in the normal portions of the parts as a result of correct dimensioning of thicknesses and, on the other hand, at the level of the assembly or in other words along the portion C, as a result of the mutual action of binding of the parts which is produced by assembly in the hot state. Stresses in the longitudinal direction (especially thrust-load stresses) are distributed as follows:

by means of the friction forces arising from the binding action which is produced by the part A on the part B and results from differential expansion effects;

by means of the shearing stresses developed in the lips of the bare metal of the part B which is inserted in the circular grooves G machined in the part A;

by means of the bending and shearing stresses which arise at the level of the groove S defined by the cones having angles $\alpha$ and $\beta$ respectively at the vertex. In fact, this arrangement and especially the external lip corresponding to the cone having an angle $\alpha$ at the vertex acts in much the same manner as a clamping jaw, the opening of which is locked by means of the arrangement defined by the cone having an angle $\beta$ at the vertex. It is therefore apparent that this arrangement is fundamental.

By way of example, parts having a diameter of 32 mm are capable of withstanding an internal pressure of 600 bar as a result of application of this method. Helium tests for leak-tightness and X-ray photographs were excellent.

During destructive testing carried out on parts assembled in accordance with the method of the invention, it is apparent that incipient destruction takes place, not at the level of the joint formed between the parts, but in the normal portions of said parts.

Figure 2:
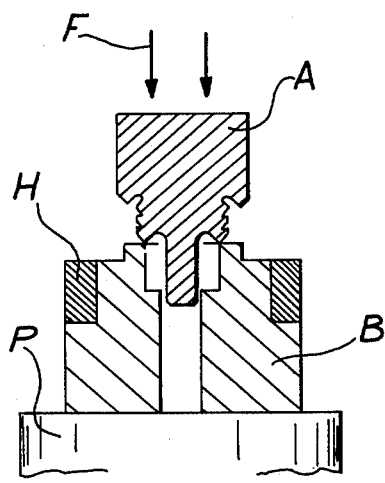
FIG. 2 is a vertical sectional view of the mode of execution corresponding to the second step of the method.

FIG. 2 illustrates the second step of the method which follows the machining or lathe-turning operation. The two parts A and B to be assembled after machining in the manner described earlier are placed in a furnace at a temperature of the order of 462° C. It will be readily apparent that this temperature depends on the nature of the malleable metal constituting the part B. When a uniform temperature has been attained, the complete assembly of both parts is introduced in a press which is represented diagrammatically in FIG. 2 by the plate P. In this figure, the arrows F represent the force applied to the movable plate of the press in order to fit the parts one inside the other. The operation should preferably be of short duration in the case of parts having small dimensions in order to prevent excessive heat loss.

As mentioned earlier, the heating step is not necessary. For example, if the first part is formed of stainless steel and the second part is formed of lead, the forging operation is carried out directly.

Moreover, different pairs of metal can be employed. Among these can be mentioned ordinary steel with magnesium or aluminum, molybdenum and magnesium.

In the case of parts designed to withstand high stresses under normal conditions of utilization, it is an advantage to place a steel hoop H on the soft metal part, namely on the part B, and to maintain light pressure on the two parts on completion of the assembly operation. In all cases, cooling is performed in atmospheric air at room temperature. This cooling can be accelerated by placing the portion having the highest thermal conductivity in water.

The assembly thus obtained has very good properties of leak-tightness with respect to a pressure difference between fluids located inside and outside the assembled tubular parts. More precisely, pressure-tightness is ensured when the fluid is circulated within the tubular parts either at a very high pressure with respect to the exterior or, on the contrary, at a very low pressure with respect to the exterior.

A method of assembly of two metallic parts as described in the foregoing is applicable in particular to the construction of an irradiation device in which an aluminum sleeve (part B) working at high pressure and temperature is intended to be connected to an associated stainless steel structure (part A). It is readily apparent that other types of assembly can be constructed provided that both parts are of metal, one part being malleable whilst the other part has relatively high hardness. A junction of this type offers a particular advantage in that it dispenses with the need for coupling flanges or seals which entail high capital expenditure. The junction is particularly suitable for industries which are concerned with problems related to production of vacuum, circulation of gases, of vapor or of liquid, or problems related to cryogenics. A further advantage lies in the fact that there is no need for any welded joint, thus avoiding the drawbacks arising from welding processes.

We claim:

1. A method of assembly of two tubular parts, the first part being formed of a hard metal the second part being formed of a malleable metal, the two tubular parts having a common axis of assembly, said method comprising the steps of (1) machining the end portion of said first part to reduce the external diameter of the end portion of said first part over a given length, designated as the assembly length, said first part end portion being machined along the assembly length in such a manner that the assembly length is a surface of revolution about the axis of the said first part, said surface of revolution including a groove at the portion of the assembly length most remote from the end of the first tubular part which carries said surface of revolution, said groove having a first conical surface at an angle $\alpha$ to the axis of the said first tubular part, said groove having a second conical surface at an angle $\beta$ to the axis of said first tubular part, the said first and second conical surfaces being joined at corresponding ends thereof by a curved, beaded segment, designated as a toric surface, the said first conical surface opening to the original external surface of the said first tubular part, the said second conical surface opening to said portion of reduced diameter of the first tubular part, said assembly length also having at least one reversed conical surface groove of revolution axially spaced from said first mentioned groove, said reversed conical surface groove having one surface perpendicular to the axis of the first tubular part and having its other surface in the form of a conical surface which is opposite in direction, with respect to the axis of the first tubular part, to the conical surfaces in the first mentioned groove and (2) forcing an end of the second tubular part against the first tubular part end having said reduced external diameter, in a coaxial direction, to thereby deform the second tubular part end into said first mentioned groove on the first tubular part, and to thereby deform a portion of the second tubular part into said conical surface groove of revolution, the said end of the second tubular part completely filling the volume of material removed by machining from the said end of the first tubular part, the external and internal diameters of the first and second tubular parts, after said forcing step, being the same.

2. A method according to claim 1, wherein the angle $\alpha$ is greater than the angle $\beta$.

3. A method according to claim 1, wherein said parts are heated in order to bring the second part to its forging temperature before said parts are subjected to the said forcing action.

* * * * *